(12) United States Patent
Pate et al.

(10) Patent No.: US 9,360,600 B2
(45) Date of Patent: Jun. 7, 2016

(54) SYSTEM AND METHOD FOR CORRECTING THE FOCUS OF A LASER BEAM

(71) Applicant: Cymer, LLC, San Diego, CA (US)

(72) Inventors: Christopher Paul Pate, San Diego, CA (US); Jason Michael Arcand, San Diego, CA (US)

(73) Assignee: ASML Netherlands B.V., Veldhoven (NL)

(*) Notice: Subject to any disclaimer, the term of this patent is extended or adjusted under 35 U.S.C. 154(b) by 0 days.

(21) Appl. No.: 14/085,664

(22) Filed: Nov. 20, 2013

(65) Prior Publication Data

US 2015/0137011 A1 May 21, 2015

(51) Int. Cl.
| | |
|---|---|
| H05G 2/00 | (2006.01) |
| G02B 5/08 | (2006.01) |
| G02B 27/40 | (2006.01) |
| G02B 7/18 | (2006.01) |
| G02B 26/08 | (2006.01) |

(52) U.S. Cl.
CPC ............ *G02B 5/0891* (2013.01); *G02B 7/1815* (2013.01); *G02B 26/0825* (2013.01); *G02B 27/40* (2013.01); *H05G 2/008* (2013.01)

(58) Field of Classification Search
CPC .. G02B 26/0825; G02B 27/40; G02B 5/0891; G02B 7/1815; H05G 2/008
See application file for complete search history.

(56) References Cited

U.S. PATENT DOCUMENTS

| | | | | |
|---|---|---|---|---|
| 4,190,327 A | * | 2/1980 | Hughes | G02B 26/0825 359/845 |
| 5,020,895 A | * | 6/1991 | Giesen | G02B 7/1815 359/845 |
| 5,889,256 A | * | 3/1999 | Osanai | B23K 26/06 219/121.74 |
| 7,740,362 B1 | * | 6/2010 | Neil | G02B 5/08 359/845 |

(Continued)

FOREIGN PATENT DOCUMENTS

WO 2012026228 A1 3/2012

OTHER PUBLICATIONS

Millie Condron, Notification of Transmittal of the International Search Report and the Written Opinion of the Searching Authority, mailed May 28, 2015.

*Primary Examiner* — Wyatt Stoffa
(74) *Attorney, Agent, or Firm* — Card & Kaslow LLP

(57) ABSTRACT

Focus of a laser optical system can be corrected using a variable radius mirror having a focusing cavity and a separate cooling cavity. Pressure of a focusing material at a sufficiently low mass flow in the focusing cavity deforms a reflective surface mounted to the focusing cavity, changing its radius. Cooling material provided to the cooling cavity cools the variable radius mirror. A laser beam is reflected by the deformed reflecting surface to focusing optics, focusing the reflected laser beam on an EUV-emitting target, and minimizing a laser focus error by one or more of: maximizing a measured EUV power or minimizing a measured laser beam divergence. Providing focusing material at a deformation pressure and at a sufficiently low mass flow, and providing a separate cooling cavity, avoids perturbations in the reflective surface which would otherwise affect laser beam focus.

17 Claims, 2 Drawing Sheets

(56) References Cited

U.S. PATENT DOCUMENTS

| | | | |
|---|---|---|---|
| 8,894,227 B2* | 11/2014 | Knor | G02B 27/0068 359/847 |
| 2003/0184887 A1* | 10/2003 | Greywall | G02B 26/0825 359/846 |
| 2004/0012710 A1* | 1/2004 | Yaji | G02B 26/0825 348/362 |
| 2005/0002078 A1* | 1/2005 | Boettcher | G02B 26/0825 359/224.1 |
| 2009/0147386 A1* | 6/2009 | Sogard | G02B 7/1815 359/845 |
| 2010/0020423 A1* | 1/2010 | Phillips | G02B 26/06 359/846 |
| 2010/0127191 A1* | 5/2010 | Partlo | H05G 2/008 250/504 R |
| 2011/0134552 A1* | 6/2011 | Kner | G02B 26/0825 359/847 |
| 2013/0020499 A1* | 1/2013 | Kameda | G02B 7/008 250/435 |
| 2014/0104696 A1* | 4/2014 | Moreau | G02B 3/14 359/665 |
| 2015/0092287 A1* | 4/2015 | Nishio | G02B 26/0825 359/845 |

* cited by examiner

SYSTEM AND METHOD FOR CORRECTING THE FOCUS OF A LASER BEAM

BACKGROUND OF THE INVENTION

1. Field of the Invention

The present invention relates generally to laser technology for photolithography, and, more particularly, to optimization of extreme ultraviolet (EUV) light production through correction of the focus of a laser beam used to produce the EUV light.

2. Description of the Prior Art

The semiconductor industry continues to develop lithographic technologies which are able to print ever-smaller integrated circuit dimensions. Extreme ultraviolet (EUV) light (also sometimes referred to as soft x-rays) is generally defined to be electromagnetic radiation having wavelengths of between 10 and 110 nanometers (nm). EUV lithography is generally considered to include EUV light at wavelengths in the range of 10-14 nm, and is used to produce extremely small features (e.g., sub-32 nm features) in substrates such as silicon wafers. These systems must be highly reliable and provide cost-effective throughput and reasonable process latitude.

Methods to produce EUV light include, but are not necessarily limited to, converting a material into a plasma state that has one or more elements (e.g., xenon, lithium, tin, indium, antimony, tellurium, aluminum, etc.) with one or more emission line(s) in the EUV range. In one such method, often termed laser produced plasma (LPP), the required plasma can be produced by irradiating a target, such as a droplet, stream or cluster of material having the desired spectral line-emitting element with a laser beam at an irradiation site.

The spectral line-emitting element may be in pure form or alloy form (e.g., an alloy that is a liquid at desired temperatures), or may be mixed or dispersed with another material such as a liquid. This target droplet is delivered to a desired irradiation site (e.g., a primary focal spot) and illuminated by a laser source within an LPP EUV source plasma chamber for plasma initiation and the generation of EUV light. It is necessary for the laser beam, such as from a high power $CO_2$ laser source, to be focused by a focusing optic on a position through which the target droplet will pass and timed so as to intersect the target droplet when it passes through that position in order to hit the target droplet properly to obtain a good plasma, and thus, good EUV light.

Among possible issues affecting focus of the high power laser source on the target are collimation issues with the laser beam from the laser source, and aberrations introduced by the optical path including the focusing optic. This focusing optic is known as a final focus lens (FFL), and may be a lens.

The laser beam produced by the laser source should be collimated, that is, the light rays forming the beam are parallel. The focusing optic is commonly designed as an infinite conjugate, which assumes the laser beam received by the focusing optic is collimated. In practice, the beam from the laser source may be divergent, with the beam size increasing with distance, or convergent, with the beam size decreasing with distance. Collimation errors may also be introduced by other optical elements along the laser beam path. Deviations from a high degree of collimation in the laser beam thereby affect the focus of the laser beam on the target droplet, which can result in reduced laser power on the target droplet, and reduced EUV production.

The focusing optic focuses the laser beam on the target droplet. This focusing optic is known as a final focus lens (FFL). Focus errors in the final focus lens can spread the power of the laser source over a larger volume, reducing the power of the laser source delivered to the target droplet. Reduced laser source power delivered to the target droplet can result in a reduced EUV power production.

In the optical arts, a component known as a variable radius mirror (VRM) has been developed, for example by II-VI Infrared Incorporated. Such a variable radius mirror comprises a liquid filled cavity covered with a deformable reflective surface. By varying the pressure of the liquid in the cavity, the reflective surface is deformed, thereby changing the effective radius of the reflective surface. The effective radius of the variable radius mirror is thus determined by the pressure of the liquid in the cavity covered by the reflective surface.

For use with high power infrared ($CO_2$) lasers, the reflective surface of the VRM is typically a thin copper sheet with optical coatings to increase reflectance at the operating wavelength. While the resulting reflectance is high, for example, 98% to 99%, when used with multi-kilowatt high power $CO_2$ lasers, such reflectance values still result in significant energy transfer from the laser beam into the reflective surface, causing heating. To prevent thermal damage caused by overheating, the reflective surface must therefore be cooled. This has been accomplished by flowing the pressurized liquid through the cavity to thereby remove the generated heat from the reflective surface.

Testing has revealed that such a VRM is not suitable for use prior to the final focus lens in the optical system of a LPP EUV light source, as the fluid flow through the VRM generates perturbations in the reflective surface which cause instability in focus of the laser beam.

What is needed, therefore, is a way to correct the focus of the laser beam on the target in a LPP EUV system while avoiding instability in focus of the laser beam caused by VRM fluid flow.

SUMMARY

In an embodiment is presented a system comprising: a variable radius mirror having a deformable reflective surface and configured to receive and reflect a laser beam at the reflective surface, the variable radius mirror having: a cooling cavity configured to pass a cooling material to cool the variable radius mirror; and a focusing cavity configured to receive a focusing material and deform the reflective surface as a function of a deformation pressure of the received focusing material; a cooling controller configured to provide the cooling material to the cooling cavity; and a pressure controller configured to provide to the focusing cavity the focusing material with the deformation pressure.

In a further embodiment is presented a system where the pressure controller is further configured to adjust the deformation pressure of the focusing material to minimize a laser focus error. In one embodiment the laser focus error is minimized by adjusting the deformation pressure of the focusing material to maximize a measured EUV power. In another embodiment the laser focus error is minimized by adjusting the deformation pressure of the focusing material to minimize a measured divergence error of the laser beam.

In a still further embodiment is presented a system where the cooling controller is further configured to provide the cooling material to a cooling cavity input port at a mass flow which is a function of a measured temperature of the variable radius mirror.

In a yet further embodiment is presented a system where the pressure controller is further configured to provide the focusing material to the focusing cavity at a sufficiently low mass flow to avoid causing a perturbation in the reflective surface.

In an embodiment is presented a method of correcting focus of a laser beam, comprising: receiving a cooling material into a cooling cavity of a variable radius mirror; receiving a focusing material into a focusing cavity of the variable radius mirror, the focusing cavity having a reflective surface mounted thereto, the focusing material having a deformation pressure; receiving a laser beam at the reflective surface and reflecting the received laser beam to a focusing optic focusing the laser beam on an EUV-emitting target; and adjusting the deformation pressure of the focusing material thereby deforming the reflective surface of the variable radius mirror to minimize a laser focus error on the EUV-emitting target.

In a further embodiment is provided a method where adjusting the deformation pressure of the focusing material to minimize a laser focus error comprises adjusting the deformation pressure of the focusing material to maximize a measured EUV power produced by the EUV-emitting target.

In a still further embodiment is provided a method where adjusting the deformation pressure of the focusing material to minimize a laser focus error comprises adjusting the deformation pressure of the focusing material to minimize a measured divergence error of the laser beam.

In a yet further embodiment is provided a method where receiving a cooling material into a cooling cavity of the variable radius mirror further comprises receiving the cooling material at a mass flow which is a function of a measured temperature of the variable radius mirror.

In a yet further embodiment is provided a method where receiving the focusing material into the focusing cavity further comprises receiving the focusing material at a sufficiently low mass flow to avoid causing a perturbation in the reflective surface.

DETAILED DESCRIPTION OF THE INVENTION

In the present approach, focusing errors of a laser source on an extreme ultraviolet (EUV) emitting target in a laser produced plasma (LPP) EUV light source such as collimation errors are corrected using a variable radius mirror (VRM) having a focusing cavity and a separate cooling cavity. Pressure of a focusing material in the focusing cavity deforms a reflective surface mounted to the focusing cavity, changing the radius of the reflective surface such that when the reflective surface of the VRM reflects light from a laser source to a focusing optic, focusing errors are minimized, thus delivering more laser energy to the EUV emitting target and maximizing EUV power. By maintaining the pressure of the focusing material at a sufficiently low mass flow at which perturbations are not introduced in the reflective surface, the VRM corrects focus without introducing perturbations into the reflective surface which would otherwise disturb focus of the laser beam.

Figure 1:
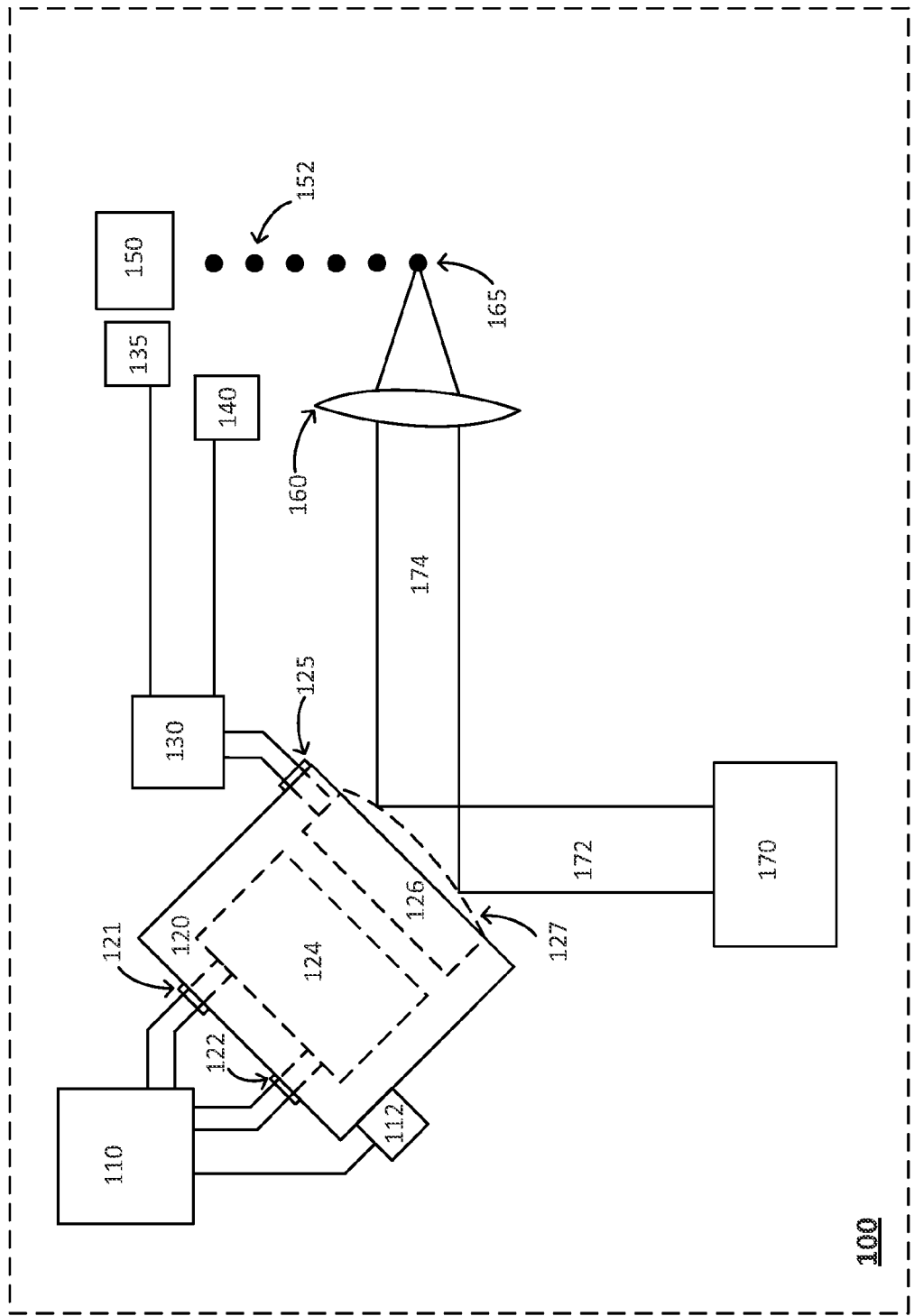
FIG. 1 is a diagram of an LPP EUV system according to an embodiment.

FIG. 1 is a diagram of an LPP EUV light source 100 according to an embodiment. A laser source 170, such as a high power $CO_2$ laser, produces a laser beam 172. Laser beam 172 is received by a reflective surface 127 of a variable radius mirror (VRM) 120, which reflects the laser beam 172 as a reflected beam 174 to a focusing optic 160. Focusing optic 160, which in one embodiment is a lens, focuses the reflected beam 174 to a focal point 165. Measurements of the laser beam are provided by an optical metrology module 135. A droplet generator 150 produces and ejects droplets 152 of an appropriate EUV emitting target material to focal point 165. Droplets 152 are irradiated at focal point 165, producing a plasma that emits EUV light. The resulting EUV light is measured by a EUV power sensor 140. Not shown is an elliptical collector which focuses the EUV light from the plasma for delivering the produced EUV light to, e.g., a lithography system, also not shown.

VRM 120 has a focusing cavity 126 and a separate cooling cavity 124. Reflective surface 127 is mounted to the front of focusing cavity 125. Reflective surface 127 may be a thin metal sheet, optionally with antireflective coatings suitable for the wavelength of laser source 170. Pressure of a focusing material in focusing cavity 126 deforms reflective surface 127. The focusing material may be a gas or a liquid (e.g. water). This deformation changes a radius of reflective surface 127, which thereby alters the focus of laser beam 174 reflected to and through focusing optic 160.

By changing the radius of reflective surface 127, pressure controller 130 corrects for possible issues affecting focus of the laser beam 174 irradiating the droplet 152 at focal point 165 to maximize EUV power. Such issues include collimation of the laser beam 172 received at reflective surface 127.

Pressure controller 130 provides focusing material to focusing cavity 126 through a port 125 with a deformation pressure and at a sufficiently low mass flow at which perturbations are not introduced in the reflective surface. Providing focusing material to focusing cavity 126 at such a sufficiently low mass flow allows laser focus errors to be minimized without introducing perturbations into the reflective surface which would otherwise disturb focus of the laser beam.

For the purposes of the present approach, providing focusing material at a sufficiently low mass flow means that the deformation pressure is maintained in the focusing cavity with a mass flow below a level at which perturbations in reflective surface 127 are produced. Such a mass flow level will be implementation specific, depending, for example, on one or more of the characteristics of VRM 120, the characteristics of pressure controller 130, the characteristics of laser source 170 and the optical path, and the focus requirements of focusing optic 160. This mass flow level may be determined in an implementation by observing increasing levels of mass flow until perturbations caused by the mass flow result in an undesirable level of laser focus error as determined by one or more of a decrease in measured EUV power, or a decrease in measured laser beam quality, as described further herein.

Pressure controller 130 adjusts the deformation of reflective surface 127, changing its radius, by changing the deformation pressure of the focusing material being provided to focusing cavity 126. By changing the deformation pressure for example from a first steady-state deformation pressure to a second steady-state deformation pressure, pressure controller 110 prevents perturbations in reflective surface 127.

Pressure controller 130 adjusts the deformation pressure of the focusing material being provided to focusing cavity 126 to correct the focus of laser beam 174 irradiating droplet 152 at focal point 165 to minimize a laser focus error.

In one embodiment, pressure controller 130 minimizes laser focus error by maximizing a measured EUV power from the EUV-emitting target droplet provided to the focal point. EUV power sensor 140 determines the EUV power produced by droplet 152 irradiated at focal point 165. EUV power sensor 140 may be a photodiode EUV sensor such as those produced by IMEC International, or other EUV sensors known in the art. Pressure controller 130 uses this sensed EUV power to adjust the deformation pressure of the focusing material to focusing cavity 126. Maximizing the laser energy on droplet 152 irradiated at focal point 165 maximizes the EUV power emitted from the droplet and thus minimizes laser focus error.

In another embodiment, pressure controller 130 minimizes laser focus error by minimizing a measured divergence error of the laser beam. Optical metrology module 135 measures the quality of the laser beam from laser source 170. Such measurements are well known in the art and can be made by using commercially available devices such as a wavefront sensor device. Pressure controller 130 uses this measured value, or other laser beam quality measurement from optical metrology module 135, to adjust the deformation pressure of the focusing material to focusing cavity 126. Optimizing the measured value of the laser beam divergence thus minimizes laser focus error.

In a further embodiment, pressure controller 130 may use a combination of measured EUV power and measured divergence error of the laser beam in adjusting the deformation pressure of the focusing material to focusing cavity 126 to minimize laser focus error.

An example pressure controller 130 for providing focusing material at a desired deformation pressure and at a sufficiently low mass flow may be a combination of one or more pumps and reservoirs, as is known in the art, controlled by a controller to provide a steady-state pressure of focusing material to port 125 of focusing cavity 126. Pressure controller 130 maintains a desired deformation pressure of focusing material based on input from EUV power sensor 140 using a controller which may be programmable logic such as microprocessor. Parameters such as specific deformation pressures will be implementation specific, depending for example on the configurations of VRM 120, laser source 170, and focusing optic 160, and are determinable by one of ordinary skill in the art in light of the teachings herein.

A cooling controller 110 provides a cooling material with a non-zero mass flow to an input port 122 of cooling cavity 124. The cooling material may be a gas or a liquid (e.g. water). In the present approach, a non-zero mass flow of cooling material means a mass flow of cooling material through cooling cavity 124 sufficient to remove heat caused by the portion of laser beam 172 not reflected by reflecting surface 127. A temperature sensor 112 thermally coupled to VRM 120 senses VRM temperature for use by cooling controller 110. Separating cooling cavity 124 from focusing cavity 126, avoids perturbations caused by the mass flow of cooling material through cooling cavity 124 on focusing cavity 126 and reflective surface 127.

An example cooling controller 110 comprises a pump for circulating the cooling material through cooling cavity 124, and a pump controller responsive to temperature sensor 112 controlling the speed of the pump. The pump controller may be programmable logic such as a microprocessor programmed to read temperature sensor 122 and control the pump, for example increasing the pump speed to increase the cooling flow with increasing temperature.

The embodiment shown in FIG. 1 shows a cooling cavity 124 with input port 122 and output port 121; other embodiments may use a different number of ports to support the flow of cooling material through cooling cavity 124. Focusing cavity 126 is shown with a single port 125. Providing the focusing material to the focusing cavity through a single port minimizes fluid flow through the focusing cavity, thereby helping to avoid perturbations on reflecting surface 127.

Figure 2:
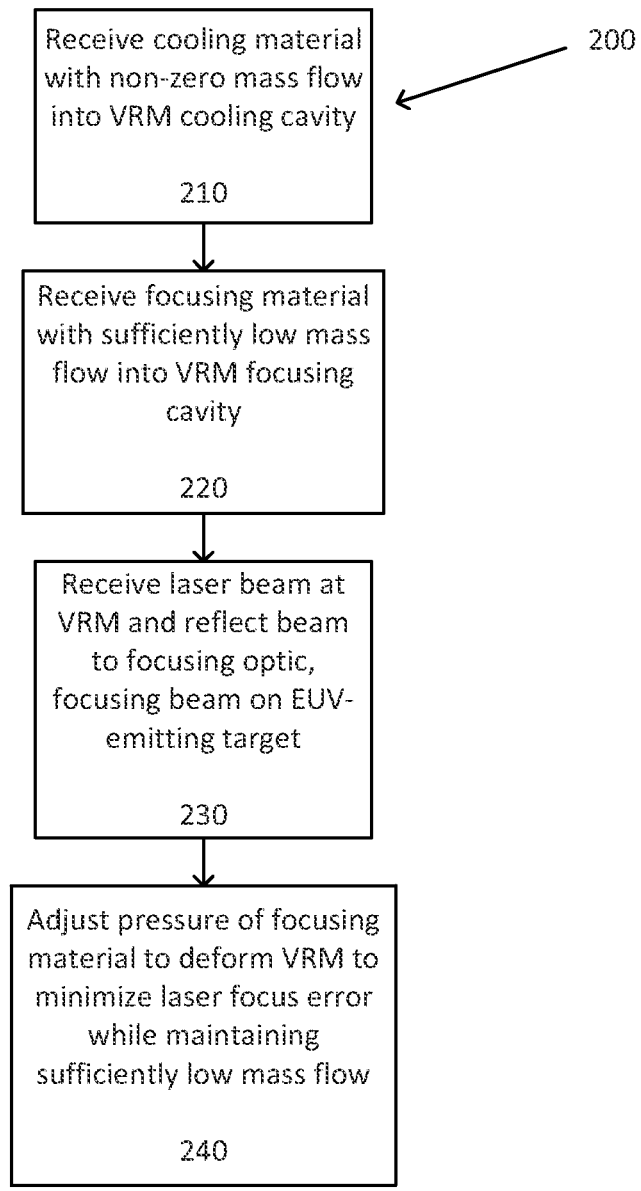
FIG. 2 is a flowchart of a focusing method according to an embodiment.

Turning now to FIG. 2, a flowchart of a focusing method 200 according to an embodiment is shown.

In step 210, cooling material with a non-zero mass flow is received into a VRM cooling cavity. In an embodiment, cooling controller 110 provides cooling material with a non-zero mass flow to input port 122 of cooling cavity 124. Cooling material flowing through cooling cavity 124 removes heat transferred by laser beam 172 into reflective surface 127.

In step 220, focusing material with a sufficiently low mass flow is provided to the VRM focusing cavity. In an embodiment, pressure controller 130 provides focusing material at a deformation pressure and at a sufficiently low mass flow to focusing cavity 126 through port 125. As described elsewhere herein, a sufficiently low mass flow means that the deformation pressure is maintained in the focusing cavity with a mass flow below a level at which perturbations in reflective surface 127 are produced. The focusing material at a deformation pressure and at a sufficiently low mass flow deforms reflective surface 127, changing its radius. Providing the focusing material at a sufficiently low mass flow determines the radius of reflective surface 127 without introducing perturbations into the reflective surface which would otherwise disturb focus of the laser beam.

In step 230, a laser beam is received at a reflective surface of the VRM and reflected to a focusing optic, which focuses the reflected beam on an EUV-emitting target. In an embodiment, laser source 170 directs laser beam 172 to reflective surface 127 where it is reflected as reflected beam 174 to focusing optic 160. The radius of reflective surface 127, determined by the focusing material at a deformation pressure and at a sufficiently low mass flow provided by pressure controller 130, changes the characteristics of laser beam 172 received at reflective surface 127 as present in reflected beam 174. Such changes maximize EUV power by correcting for issues such as collimation of laser beam 172. Focusing optic 160 focuses reflected beam 174 to focal point 165 where droplet 152 from droplet generator 150 is irradiated, producing a plasma which then produces EUV light.

In step 240, the deformation pressure of the focusing material is adjusted to minimize a laser focus error. In embodiments, pressure controller 130 adjusts the deformation pressure of the focusing material to minimize laser focus error through one or more approaches, such as minimizing laser focus error by maximizing measured EUV power, or by minimizing laser focus error by minimizing the measured divergence error of the laser beam, as described elsewhere herein. Pressure controller 130 by adjusting the deformation pressure in response to such measurements changes the characteristics of laser beam 172 received at reflective surface 127 as present in reflected beam 174. Such changes minimize the laser focus error. As an example and as explained elsewhere herein, by changing from a first steady-state deformation pressure to a second steady-state deformation pressure, pressure controller 110 prevents perturbations in reflective surface 127 by maintaining a sufficiently low mass flow at the first and second steady-state deformation pressures.

The disclosed method and apparatus have been explained herein with reference to several embodiments. Other embodiments will be apparent to those skilled in the art in light of this disclosure. Certain aspects of the described method and apparatus may readily be implemented using configurations other than those described.

Additionally, different types of laser sources, optical paths, and/or focus lenses may be used. Different types of pumps, controllers, and/or control logic may also be used and still be within the scope of the disclosure.

Further, it should also be appreciated that the described method and apparatus can be implemented in numerous ways, including as a process, an apparatus, or a system. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system comprising:
    a variable radius mirror having a deformable reflective surface and configured to receive and reflect a laser beam at the reflective surface, the variable radius mirror having:
        a cooling cavity configured to pass a cooling material to cool the variable radius mirror; and
        a focusing cavity configured to receive a focusing material and deform the reflective surface as a function of a deformation pressure of the received focusing material;
    a cooling controller configured to provide the cooling material to the cooling cavity; and
    a pressure controller configured to provide to the focusing cavity the focusing material with the deformation pressure where the pressure controller is configured to adjust the deformation pressure of the focusing material to minimize a laser focus error by being further configured to adjust the deformation pressure of the focusing material to maximize a measured EUV power from an EUV-emitting target droplet provided to a focal point.

2. The system of claim 1 further comprising a laser source configured to generate the laser beam.

3. The system of claim 1 further comprising a focusing optic configured to receive the reflected laser beam from the reflective surface of the variable radius mirror, and focus the reflected laser beam at the focal point.

4. The system of claim 3 further comprising an EUV-emitting target droplet generator configured to provide the EUV-emitting target droplet to the focal point.

5. The system of claim 1 where the pressure controller is configured to minimize a laser focus error by being further configured to adjust the deformation pressure of the focusing material to minimize a measured divergence error of the laser beam.

6. The system of claim 1 where the cooling material is a liquid.

7. The system of claim 1 where the focusing material is a liquid.

8. The system of claim 1 where the cooling controller is further configured to provide the cooling material to a cooling cavity input port at a mass flow which is a function of a measured temperature of the variable radius mirror.

9. The system of claim 1 where the pressure controller is further configured to provide the focusing material to the focusing cavity at a sufficiently low mass flow to avoid causing a perturbation in the reflective surface.

10. The system of claim 1 where the focusing cavity has a single port and the pressure controller is configured to provide the focusing material to the single port.

11. The system of claim 1 where the cooling cavity has an input port and an output port and the cooling controller is configured to provide the cooling material to the input port.

12. A method of correcting focus of a laser beam, comprising:
    receiving a cooling material into a cooling cavity of a variable radius mirror;
    receiving a focusing material into a focusing cavity of the variable radius mirror, the focusing cavity having a reflective surface mounted thereto, the focusing material having a deformation pressure;
    receiving a laser beam at the reflective surface and reflecting the received laser beam to a focusing optic focusing the laser beam on an EUV-emitting target; and
    adjusting the deformation pressure of the focusing material thereby deforming the reflective surface of the variable radius mirror to minimize a laser focus error on the EUV-emitting target, where adjusting the deformation pressure of the focusing material to minimize the laser focus error comprises adjusting the deformation pressure of the focusing material to maximize a measured EUV power produced by the EUV-emitting target.

13. The method of claim 12 further comprising generating the laser beam and directing the laser beam to the reflective surface of the variable radius mirror.

14. The method of claim 12 further comprising receiving at the focusing optic the reflected beam from the variable radius mirror, and focusing the received reflected beam by the focusing optic on the EUV-emitting target.

15. The method of claim 12 where adjusting the deformation pressure of the focusing material to minimize a laser focus error further comprises adjusting the deformation pressure of the focusing material to minimize a measured divergence error of the laser beam.

16. The method of claim 12 where receiving a cooling material into a cooling cavity of the variable radius mirror further comprises receiving the cooling material at a mass flow which is a function of a measured temperature of the variable radius mirror.

17. The method of claim 12 where receiving the focusing material into the focusing cavity further comprises receiving the focusing material at a sufficiently low mass flow to avoid causing a perturbation in the reflective surface as determined by observing increasing levels of mass flow until perturbations caused by the mass flow result in an undesirable level of laser focus error as determined by one or more of a decrease in measured EUV power or a decrease in measured laser beam quality.

* * * * *